US012737455B2

(12) United States Patent
Hong et al.

(10) Patent No.: US 12,737,455 B2
(45) Date of Patent: Sep. 15, 2026

(54) MULTI-PROCESS CLUSTERING-BASED RANSOMWARE ATTACK DETECTION DEVICE AND METHOD, AND RECORDING MEDIUM FOR RECORDING PROGRAM FOR IMPLEMENTING METHOD

(71) Applicant: SECUVE CO., LTD., Seoul (KR)

(72) Inventors: Ki-Yoong Hong, Seoul (KR); Kyu-Ho Lee, Gwangmyeong-si (KR); Sung-Geun Lee, Seoul (KR); Jung-Soo Park, Daejeon (KR); Dong-Ho Choi, Incheon (KR); Tae-Hoon Kim, Goyang-si (KR)

(73) Assignee: SECUVE CO., LTD., Seoul (KR)

( * ) Notice: Subject to any disclaimer, the term of this patent is extended or adjusted under 35 U.S.C. 154(b) by 488 days.

(21) Appl. No.: 17/269,905

(22) PCT Filed: Dec. 10, 2020

(86) PCT No.: PCT/KR2020/018040

§ 371 (c)(1),
(2) Date: Jun. 20, 2023

(87) PCT Pub. No.: WO2022/102854

PCT Pub. Date: May 19, 2022

(65) Prior Publication Data

US 2023/0334151 A1 Oct. 19, 2023

(30) Foreign Application Priority Data

Nov. 12, 2020 (KR) ........................ 10-2020-0151022

(51) Int. Cl.
*G06F 21/55* (2013.01)
*G06F 21/56* (2013.01)

(52) U.S. Cl.
CPC .......... *G06F 21/554* (2013.01); *G06F 21/552* (2013.01); *G06F 21/566* (2013.01); *G06F 2221/034* (2013.01)

(58) Field of Classification Search
CPC .... G06F 21/554; G06F 21/552; G06F 21/566; G06F 2221/034
See application file for complete search history.

(56) References Cited

U.S. PATENT DOCUMENTS

2021/0406368 A1* 12/2021 Agranonik .............. G06F 9/542

FOREIGN PATENT DOCUMENTS

CN 110598410 A * 12/2019 ........... G06F 21/566
EP 3716110 A1 * 9/2020 ........... G06F 21/554
KR 10-2019-0021673 A 3/2019

OTHER PUBLICATIONS

Antonia Nisioti • Alexios Mylonas • Paul D. Yoo • Vasilios Katos; From Intrusion Detection to Attacker Attribution: A Comprehensive Survey of Unsupervised Methods; IEEE Communications Surveys & Tutorials (vol. 20, Issue: 4, 2018, pp. 3369-3388); (Year: 2018).*

(Continued)

*Primary Examiner* — Luu T Pham
*Assistant Examiner* — Chao Wang
(74) *Attorney, Agent, or Firm* — Studebaker Brackett PLLC

(57) ABSTRACT

The present disclosure relates to a ransomware attack detection device and method, and a recording medium having a program recorded thereon, the program for implementing the method. More particularly, the present disclosure relates to a multiprocess clustering-based ransomware attack detection device and method, and a recording medium having a program recorded thereon, the program being configured to implement the method, wherein a cluster ID for a cluster assigned to processes created at a kernel level of an operating system (OS) is created, processes branched from one (Continued)

parent process information read and written by the processes are clustered for each cluster ID, and a ransomware attack is detected and blocked according to whether the clustered information is changed or damaged.

10 Claims, 5 Drawing Sheets

(56) References Cited

OTHER PUBLICATIONS

Ricardo Macedo • Aldri Santos • Yacine Ghamri-Doudane • Michele Nogueira; A scheme for DDoS attacks mitigation in IdM systems through reorganizations; NOMS 2016—2016 IEEE/IFIP Network Operations and Management Symposium (2016, pp. 298-305); (Year: 2016).*

Badis Hammi • Joel Hachem • Ali Rachini • Rida Khatoun • Hassane Aissaoui; Malware Detection Through Windows System Call Analysis; 2024 Ninth International Conference on Mobile and Secure Services (MobiSecServ) (vol. CFP24RAC-ART, 2024, pp. 1-7); (Year: 2024).*

* cited by examiner

FIG. 2

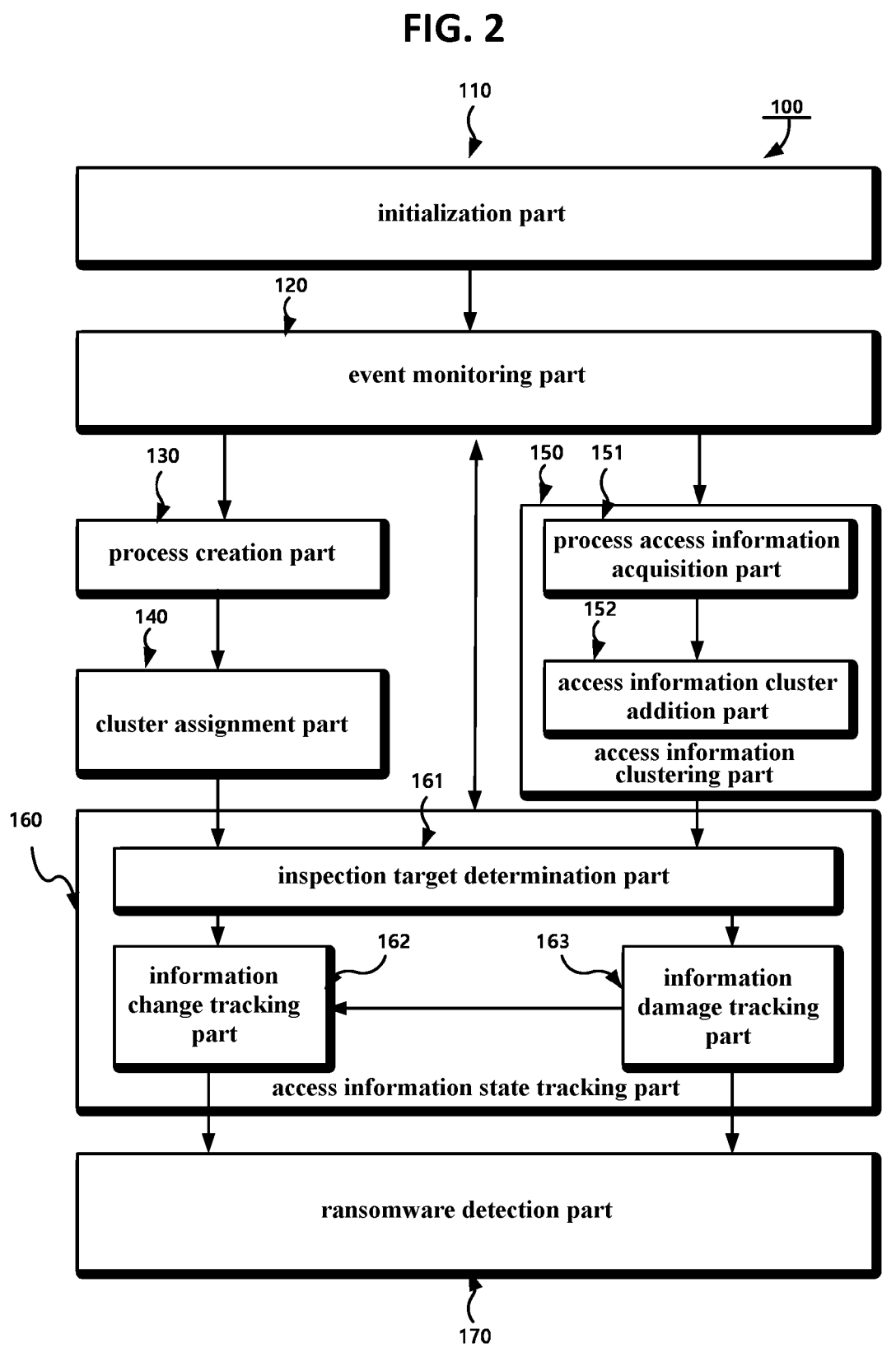

110
100
initialization part
120
event monitoring part
130
process creation part
140
cluster assignment part
150
151
process access information acquisition part
152
access information cluster addition part
access information clustering part
161
160
inspection target determination part
162
information change tracking part
163
information damage tracking part
access information state tracking part
ransomware detection part
170

MULTI-PROCESS CLUSTERING-BASED RANSOMWARE ATTACK DETECTION DEVICE AND METHOD, AND RECORDING MEDIUM FOR RECORDING PROGRAM FOR IMPLEMENTING METHOD

CROSS-REFERENCE TO RELATED APPLICATIONS

This application is the U.S. National Stage of International Application No. PCT/KR2020/018040 filed Dec. 10, 2020, which claims benefit of priority to Korean Patent Application No. 10-2020-0151022 filed Nov. 12, 2020, the entire content of which is incorporated herein by reference.

TECHNICAL FIELD

The present disclosure relates to a ransomware attack detection device and method, and a recording medium having a program recorded thereon, the program for implementing the method. More particularly, the present disclosure relates to a multiprocess clustering-based ransomware attack detection device and method, and a recording medium having a program recorded thereon, the program being configured to implement the method, wherein processes created from one parent process at a kernel level of an operating system (OS) and information read and written by the processes are clustered on the basis of one cluster identification (hereinafter, referred to as an "ID"), and a ransomware attack is detected and blocked according to whether the information clustered on a per-cluster basis is changed or damaged.

BACKGROUND ART

For modern people and companies, various servers as well as endpoint devices, for example, communication terminals, such as smartphones, and computer terminals, such as laptop computers, desktop computers, and personal computers, are essential items.

It is common that important information of individuals and companies is stored in these various servers and endpoint devices.

For this reason, hackers insert various malicious codes into various servers and endpoint devices to cause the devices to break down, or to encrypt or damage information, such as important documents, stored in the devices.

Among these malicious codes, a typical malicious code is ransomware.

Ransomware, a portmanteau of ransom and ware, is a type of malicious program that prevents users from using the users' personal documents stored in the users' computers or smartphones. It is common that ransomware distributors demand money for providing a vaccine that is capable of decrypting the users' personal documents that have been encrypted to be unusable by ransomware.

Such ransomware has become sophisticated, intelligent, and targeted over time. Some attacks have now acquired a new data exfiltration method, which may cause companies damage greater than traditional data loss due to conventional ransomware. In particular, there is an increasing likelihood that such attacks do not disappear and increase further.

Many ransomware infections start from workstation infections, so endpoint anti-malicious code software is used to prevent such ransomware.

The endpoint anti-malicious code software is application software that runs at an application layer, which is a higher level of an operating system (OS) layer.

However, there is a problem that various types of servers and endpoint anti-malicious code software running at the application layer cannot detect the latest ransomware until a vaccine is updated.

Recently, a ransomware attack detection device running at the OS layer has been under development. The device sets access rights of a process, and checks the access rights to determine whether there is ransomware, so it takes a lot of time to check the access rights for all processes. In addition, setting access rights for all processes is inconvenient, and processes for which access rights are not set may be mistaken for ransomware.

There is a need for a method that is capable of quickly detecting the latest ransomware without updating a vaccine and setting rights.

SUMMARY

According to some embodiments of the present disclosure, a ransomware attack detection device and method, and a recording medium having a program recorded thereon, and the program for implementing the method are provided. The multiprocess clustering-based ransomware attack detection device includes: an event monitoring part configured to monitor whether a clustering event is generated in response to a process creation request and information access; a process creation part configured to create a process when the clustering event is generated in response to the process creation request; a cluster assignment part configured to determine whether the created process is a parent process, and to assign an unused cluster identification (ID) when the created process is the parent process or assign a cluster ID assigned to the parent process of the created process when the created process is not the parent process, and to cluster processes related to a cluster having the cluster ID; an access information clustering part configured to cluster information accessed by any process of the cluster, and to add the information to an information set for the cluster; an access information state tracking part configured to determine whether any process among the processes clustered for the cluster accesses the information within the cluster, to detect access to the information by the any process as generation of inspection target information, and to obtain an information change count and an information damage count of the cluster related to the detected inspection target information; and a ransomware detection part configured to determine the process as ransomware when the information change count and the information damage count exceed respective threshold values and to exit the processes of the cluster into which the process is clustered. The cluster assignment part is configured to obtain and assign the cluster ID following a latest assigned cluster ID in an unused cluster set when the cluster ID of the parent process of the created process is 0, or obtain the cluster ID of the parent process when the cluster ID of the parent process is not 0, and assign the cluster ID to the created process, and add the created process to a cluster having the cluster ID to cluster the created process and the processes related thereto into one cluster. The event monitoring part is configured to monitor access by any process in the cluster having the cluster ID, to particular information, and the access information clustering part comprises: a process access information acquisition part configured to acquire the particular information accessed by any process of the cluster having the cluster ID; and an access information cluster addition part configured to add the acquired particular information to a cluster information set for the cluster ID.

DISCLOSURE

Technical Problem

Accordingly, the present disclosure is directed to providing a multiprocess clustering-based ransomware attack detection device, method, and a recording medium having a program recorded thereon, the program being configured to implement the method, wherein an cluster ID is created to cluster processes created at a kernel level of an operating system (OS), processes branched from one parent process and information read and written by the processes are clustered for each cluster ID, and a ransomware attack is detected and blocked according to whether the information clustered on a per-cluster basis is changed or damaged.

Technical Solution

According to the present disclosure for achieving the above objective, there is provided a multiprocess clustering-based ransomware attack detection device including: an event monitoring part configured to monitor whether a clustering event is generated in response to a process creation request and information access; a process creation part configured to create a process when the clustering event is generated in response to the process creation request; a cluster assignment part configured to assign a cluster identification (ID) to the created process and cluster processes related to a cluster having the cluster ID; an access information clustering part configured to cluster information accessed by any process within the cluster and add the information to an information set for the cluster; an access information state tracking part configured to determine whether any process among the processes clustered for the cluster accesses the information within the cluster, to detect access to the information by the any process as generation of inspection target information, and to obtain an information change count and an information damage count of the cluster related to the detected inspection target information; and a ransomware detection part configured to determine the process as ransomware when the information change count and the information damage count exceed respective threshold values, and to exit the processes of the cluster into which the process is clustered.

The device may further include an initialization part configured to initialize, when a system starts, cluster IDs of an initial process and a daemon process and a service process created by the initial process to 0, to initialize an unused cluster set (FreeC) so that the unused cluster set includes all cluster IDs except only a cluster ID of 0, and to initialize a used cluster set (AssignedC) so that the used cluster set includes only the cluster ID of 0.

The cluster assignment part may be configured to obtain and assign the cluster ID following a latest assigned cluster ID in an unused cluster set when the cluster. ID of the parent process of the created process is 0, or obtain the cluster ID of the parent process when the cluster ID of the parent process is not 0, and assign the cluster ID of the parent process to the created process, and add the created process to a cluster set having the cluster ID, and cluster the created process and the processes related thereto into the cluster.

The cluster assignment part may be configured to calculate a unique cluster ID value to be used, by performing modular arithmetic on a sum of a latest cluster ID value and an incremental value (Δ) when the cluster ID of the parent process is 0.

The access information clustering part may include: a process access information acquisition part configured to acquire information accessed when access to the information is generated by any process in the cluster set having the cluster ID through the event monitoring part; and an access information cluster addition part configured to add the acquired information to a cluster information set for the cluster ID.

The access information state tracking part may include: an inspection target determination part configured to determine whether any process among the processes clustered for the cluster accesses reformation already accessed by a process belonging to the cluster, and to detect access to the information by the process as generation of the inspection target information; an information change tracking part configured to obtain, when generation of the inspection target information is detected as change behavior, the information change count of the cluster into which the process that has generated the inspection target information is clustered; and an information damage tracking part configured to obtain the information damage count of the cluster when generation of the inspection target information is detected as damage behavior.

The information may be data and a file.

According to the present disclosure for achieving the above objective, there is provided a multiprocess clustering-based ransomware attack detection method including: monitoring, by an event monitoring part in an event monitoring stage, whether a clustering event is generated in response to a process creation request or information access; creating, by a process creation part in a process creation stage, a process when the clustering event is generated in response to the process creation request; assigning, by a cluster assignment part in a cluster assignment stage, an unused cluster ID when a cluster ID of a parent process of the created process is 0 or assigning the cluster ID of the parent process to the created process when the cluster ID of the parent process is not 0, and clustering processes related to a cluster having the cluster ID; clustering, by an access information clustering part in an access information clustering stage, information accessed by any process of the cluster, and adding the information to an information set for the cluster; determining, by an access information state tracking part in an access information state tracking stage, whether any process among the processes clustered for the cluster accesses information within the cluster, and detecting access to the information by another process as generation of inspection target information, and obtaining an information change count and an information damage count of the cluster related to the detected inspection target information; and determining, by a ransomware detection part in a ransomware detection stage, the process as ransomware when the information change count and the information damage count exceed respective threshold values, and exiting the processes of the cluster into which the process is clustered.

The method may further include: in by an initialization part in an initialization stage when a system starts, cluster IDs of an initial process and a daemon process and a service process created by the initial process to 0, and initializing, an unused cluster set (FreeC) so that the unused cluster set includes all cluster IDs except only a cluster ID of 0, and initializing a used cluster set (AssignedC) so that the used cluster set includes only the cluster ID of 0.

The cluster assignment stage may include: a parent process cluster ID acquisition step of the created process; obtaining and assigning, in a new cluster assignment step, the cluster ID following a latest assigned cluster ID in the unused cluster set when the cluster ID of the parent process is 0; assigning, in a parent process cluster assignment step, the cluster ID of the parent process to the process when the cluster ID of the parent process is not 0; adding, in a process clustering stage after assignment of the cluster, the process to a cluster set having the cluster ID to cluster the process and the processes related thereto.

In the parent process cluster assignment step, when a parent cluster ID is 0, the cluster assignment part may calculate a cluster ID value to be used, by performing modular arithmetic on a sum of a latest cluster ID value and an incremental value ($\Delta$) as a maximum cluster ID value.

The access information clustering stage may include: acquiring, by a process access information acquisition part in a process access information acquisition step, information accessed when access to the information is generated by any process of the cluster (set) having the cluster ID through the event monitoring part; and adding, by a cluster addition part in an access information cluster addition step, the acquired information to a cluster information set for the cluster ID.

The access information state tracking stage may include: determining, by an inspection target determination part in an inspection target determination step, whether any process among the processes clustered for the cluster accesses information already accessed by another process within the cluster, and detecting access to the information by the any process as generation of inspection target information; obtaining, by an Information change tracking part in an information change tracking step, the information change count of the cluster into which the process that has generated the inspection target information is clustered; and obtaining, by an information damage tracking part in an information damage tracking step, the information damage count of the cluster.

According to the present disclosure for achieving the above objective, there is provided a recording medium having a program recorded thereon, the program being configured to implement a multiprocess clustering-based ransomware attack detection method including: monitoring, by an event monitoring part in an event monitoring stage, whether a clustering event is generated in response to a process creation request or information access; creating, by a process creation part in a process creation stage, a process when the clustering event is generated in response to the process creation request; assigning, by a cluster assignment part in a cluster assignment stage, a cluster identification (ID) to the created process to cluster processes related to a cluster having the cluster ID; clustering, by an access information clustering part in an access information clustering stage, information accessed by any process of the cluster, and adding the information to an information set for the cluster; determining, by an access information state tracking part in an access information state tracking stage, whether any process among the processes clustered for the cluster accesses information already accessed by another process within the cluster, and detecting access to the information by the any process as generation of inspection target information, and obtaining an information change count and an information damage count of the cluster related to the detected inspection target information; and determining, by a ransomware detection part in a ransomware detection stage, the process as ransomware when the information change count and the information damage count exceed respective threshold values, and exiting the processes of the cluster into which the process is clustered.

Advantageous Effects

According to the present disclosure, ransomware can be quickly detected and blocked because of operation at a kernel layer of an operating system (OS).

In addition, according to the present disclosure, information accesses and changes are clustered and managed on a per-cluster basis in association with a process and a parent process of the process according to a general operation of the process, so that a process for new ransomware can be quickly and accurately detected without a separate vaccine update process.

In addition, according to the present disclosure, when a process that is ransomware accesses information, an original file can be backed up and recovered to deal with attack by the process that is ransomware.

DESCRIPTION OF DRAWINGS

FIG. 2 is a diagram illustrating a configuration of a multiprocess clustering-based ransomware attack detection device according to the present disclosure.

MODE FOR INVENTION

Hereinafter, the configuration and operation of a multiprocess clustering-based ransomware attack detection device according to the present disclosure will be described with reference to the accompanying drawings, and a ransomware attack detection method including a cluster assignment method and a ransomware determination method according to generation of a process in the device will be described. In the following description, information is used as a term including data and a file.

Figure 1:
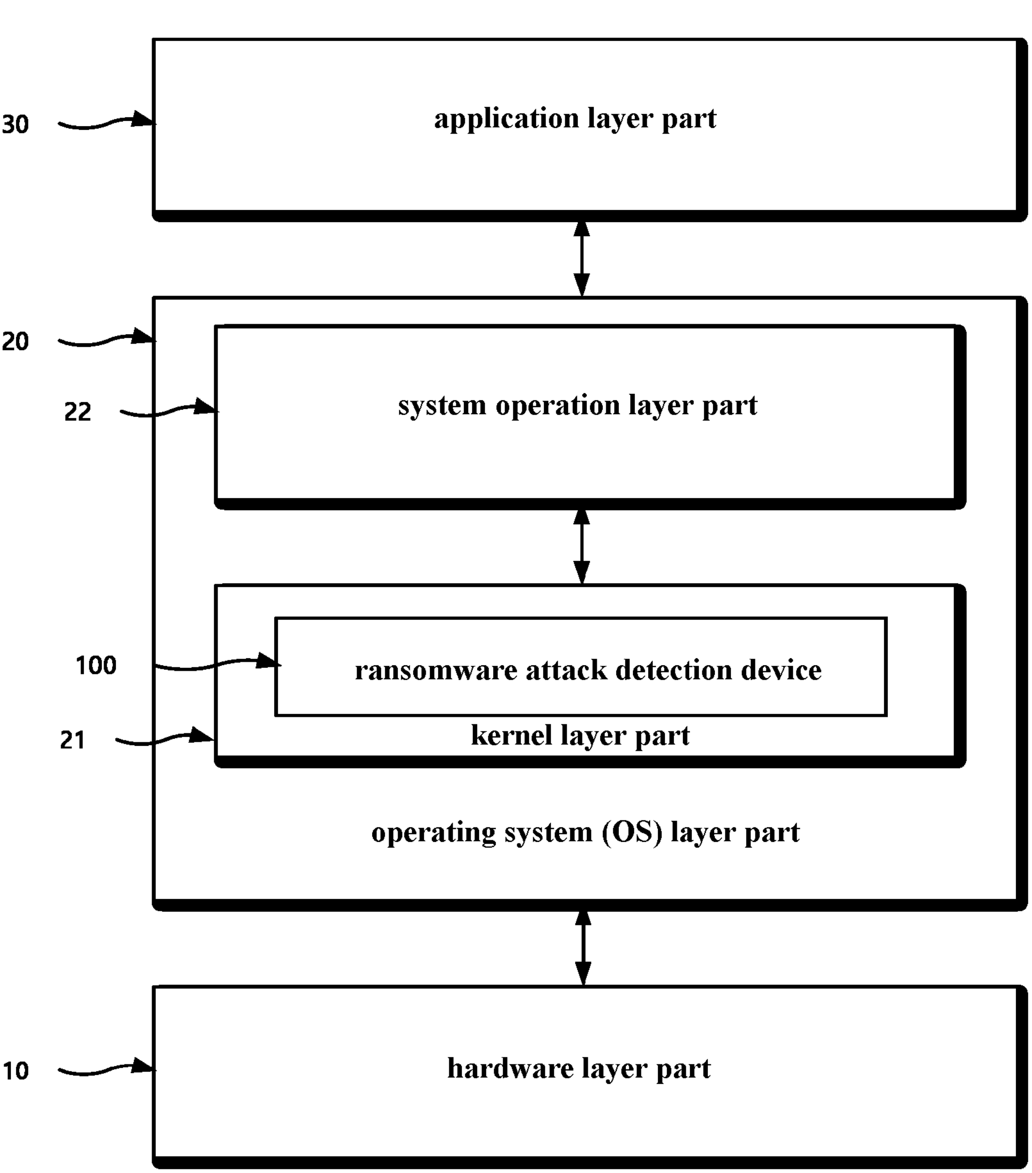
FIG. 1 is a diagram illustrating a configuration of various servers or endpoint systems including a ransomware detection device operating at a kernel layer, according to the present disclosure.
Figure 3:
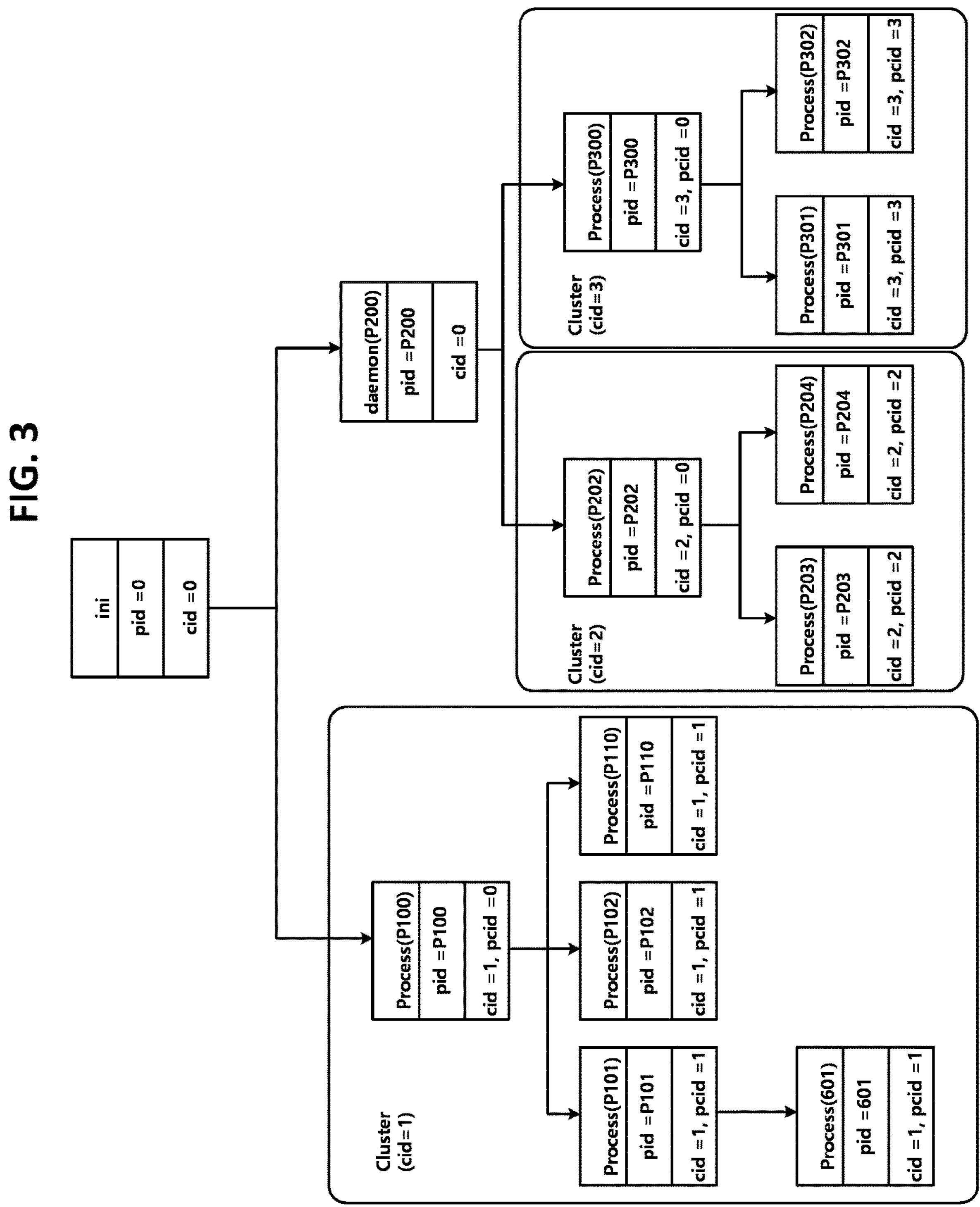
FIG. 3 is a diagram illustrating a method of assigning a cluster to processes for multiprocess clustering-based ransomware attack detection according to an embodiment of the present disclosure.

FIG. 1 is a diagram illustrating a configuration of various servers or endpoint systems including a ransomware detection device operating at a kernel layer, according to the present disclosure. FIG. 2 is a diagram illustrating a configuration of a multiprocess clustering-based ransomware attack detection device according to the present disclosure. FIG. 3 is a diagram illustrating a method of assigning a cluster to processes for multiprocess clustering-based ransomware attack detection according to an embodiment of the present disclosure. Hereinafter, the description will be made with reference to FIGS. 1 to 3.

An endpoint system according to the present disclosure refers to a system provided in an endpoint, for example, a computer terminal such as a desktop computer, a personal computer, a notebook computer, etc., or a smart terminal such as a smartphone, a smart pad, etc.

Various servers or endpoint systems include a hardware layer part 10, an operating system (OS) layer part 20, and an application layer part 30 as shown in FIG. 1. Further, the operating system layer part 20 includes a kernel layer part 21 and a system operation layer part 22.

A ransomware attack detection device 100 according to the present disclosure is provided in the kernel layer part 21 of the operating system layer part 20.

The kernel layer part 21 is provided between the hardware layer part 10 and the system operation layer part 22, and performs creation and removal of processes, creation, change, and removal of files, data input and output, and management of resources, such as memory.

The ransomware attack detection device 100 of the present disclosure assigns a unique cluster ID to processes created by the kernel layer part 21, wherein the processes include a parent process initially generated and child processes created by the parent process. In this way, processes of a family including a parent process and child processes are clustered into a cluster having the same cluster ID.

In addition, the ransomware attack detection device 100 clusters and manages, on a per-cluster basis, information accessed by processes clustered into one cluster.

Since the ransomware attack detection device 100 clusters and manages, on a per-cluster basis, processes of a family and information accessed by the processes of the family, the ransomware attack detection device 100 is capable of monitoring, on a per-cluster basis, whether information access, information change, or information damage by processes takes place.

Using this, the ransomware attack detection device 100 obtains an information change count and an information damage count of cluster-based processes (processes of a family), and uses the information change count and the information damage count to determine whether the processes of the cluster are ransomware.

When it is determined that the processes are ransomware, the ransomware attack detection device 100 exits the processes of the cluster to block the ransomware.

Specifically, referring to FIG. 2, a multiprocess clustering-based ransomware attack detection device 100 of the present disclosure includes an initialization part 110, an event monitoring part 120, a process creation part 130, a cluster assignment part 140, an access information clustering part 150, an access information state tracking part 160, and a ransomware detection part 170.

In the following description, a created process is represented by $P_{pid}$ as shown in Equation 1, and a cluster ID is represented by cid as shown in Equation 2.

$$p_{pid} \text{ where } 0 \le pid \le (n-1) \quad \text{[Equation 1]}$$

$$cid \text{ where } 0 \le cid \le (m-1) \quad \text{[Equation 2]}$$

The pid denotes a process ID, and the cid denotes a cluster ID.

The pid is an integer equal to or greater than 0 (zero). In the present disclosure, $p_0$ denotes an initial process of which the process ID is 0 in the OS. However, a process ID may have a value other than 0 depending on the OS type.

The cid is also an integer equal to or greater than 0. However, a cluster ID (cid) is set to 0 only for an initial process. In addition, a cluster ID is set to 0 for a daemon process and a service process created by the initial process.

Processes created up to now are defined as a process set (P) as shown in Equation 3 below and managed.

$$P = [p_{pid} | 0 \le pid \le (n-1)] \quad \text{[Equation 3]}$$

At the time of initial operation of the various servers and endpoint systems, the initialization part 110 initializes various parameters, such as a process ID (pid), a cluster ID (cid), an initial process ($P_0$), an initial cluster ($C_0$), an unused cluster set (FreeC), a used cluster set (AssignedC), a process set (P), etc., according to the present disclosure. The process ID and the cluster ID are initialized to 0, the unused cluster set is initialized to include all clusters except a cluster having the cluster ID of 0, and the used cluster set is initialized to include only a cluster having the cluster ID of 0.

The event monitoring part 120 monitors whether the kernel layer part 21 generates a clustering event. The clustering event is an event that causes clustering for ransomware detection to be performed, and may be generated in response to a process ($p_{pid}$) creation request, a process exit request, information access, or inspection target information detection.

When the event monitoring part 120 determines that a clustering event has been generated in response to a process creation request, the process creation part 130 creates a process ($p_{pid}$) and registers the process in the process set (P).

When the process creation part 130 creates a process ($p_{pid}$), the cluster assignment part 140 determines a result of assigning a cluster ID to a parent process by applying function getPCID($P_{pid}$) represented as in Equation 4.

$$pcid = getPCID(p_{pid}). \quad \text{[Equation 4]}$$

As a result of determination, when the cluster ID assigned to the parent process is 0, the cluster assignment part 140 acquires a cluster ID in the unused cluster set (FreeC) represented as in Equation 5, assigns the cluster ID to the process ($p_{pid}$), and registers the cluster ID in the used cluster set (AssignedC).

$$FreeC = [C_{cid} | 0 \le cid \le (m-1)].$$

$$AssignedC = \{C_{cid} | 0 \le cid \le (m-1), p_{pid} \in P\} \text{ where } cid = getCID(p_{pid}). \quad \text{[Equation 5]}$$

Before the operation of the OS, the unused cluster set (FreeC) includes all clusters. At the time of initial start of the OS, a cluster ID value is set to 0 for an initial process and a daemon process and a service process that are created by the initial process, so the FreeC does not include $C_0$.

The used cluster set (AssignedC) refers to a set of cluster IDs assigned to processes and being used. Therefore, before the operation of the OS, the used cluster set is set as an empty set, and at the time of initial start of the OS, a cluster ID value is set to 0 for an initial process and a daemon process and a service process created by the initial process, so the used cluster set (AssignedC) includes $C_0$.

Conversely, when the cluster ID assigned to the parent process is not 0, the cluster ID of the parent process is assigned to the created process ($p_{pid}$), that is, a child process ($p_{pid}$).

Equation 6 shows genCID( ) function for performing this assignment process.

[Equation 6]

```
■ genCID(p_pid) begin
    pcid = getPCID(p_pid);
  if(pcid > 0) cid ← pcid; /* inherit parent cluster ID */
    if(pcid = 0) begin /* calculate cluster ID */
      while( TRUE ) begin
        currentLCID = getLCID( );
        cid ← (currentLCID + Δ) mod m ;
        updateLCID(cid) ; /* update latestCID */
        if( (cid ≠ 0) AND (cid ∈ FreeC) ) begin
   /* (cid ≠ 0) ∧ (cid ∈ FreeC) */
          FreeC ← FreeC − C_cid;
          AssignedC ← AssignedC ∪ C_cid;
   /* (cid ≠ 0) ∧ (cid ∈ AssignedC) */
          break;
        end; /* endif */
      end; /* endwhile */
    end; /* endif */
    return(cid);
  end.
```

Herein, Δ denotes an incremental value, and may be set to a constant value, or a random value to make it difficult to predict calculation of a cluster ID (cid).

genCID( ) is a function that calculates a cluster ID (cid) for a created process and returns the cluster ID.

When a cluster ($P_{cid}$) of a parent process for a created process ($p_{pid}$) is greater than 0, the function genCID( ) inherits a cluster ID ($P_{cid}$) value of the parent process for the created process ($p_{pid}$) and calculates the cluster ID value as a cluster ID value for the created process ($p_{pid}$) and returns the cluster ID value.

When a cluster ID of a parent process for a created process ($p_{pid}$) is 0, the function genCID( ) calculates a cluster ID value by performing modular arithmetic (mod m) on the sum of the latest cluster ID (latestCID) value and an incremental value (Δ). When the calculated cluster ID (cid) value is not 0 and is included in the set (FreeC) of unused cluster IDs, the function genCID( ) removes the cluster ($C_{cid}$) from the FreeC set, adds the cluster ($C_{cid}$) to the AssignedC set, and returns the calculated cluster ID (cid) value.

The latest cluster ID (latestCID) may be obtained and updated by Equation 7.

[Equation 7]

```
■ getLCID( ) begin
    currentLCID ← latestCID ; /* read latestCID */
    return(currentLCID) ;
  end.
■ updateLCID(cid) begin
    latestCID ← cid ; /* update latestCID */
  end.
```

The function getLCID( ) obtains and returns the latest cluster ID (latestCID) value that is the most recently created.

updateLCID( ) is a function that updates the latest cluster ID (latestCID) value with an entered cid value.

The cluster ID assignment method will be more conceptually described with reference to FIG. 3.

FIG. 3 shows a case in which a used cluster set (AssignedC) is {0, 1, 2}, an unused cluster set (FreeC) is [3, . . . , m] (approximately, m=1000), an incremental value (Δ) is 1, and latestCID=2.

Since a cluster ID ($P_{cid}$) of a parent process is 0, a cluster ID ($\text{process}(300)_{cid}$) of a process (pid: 300) is +2(latest cluster ID)+1(incremental value))mod 1000=3, and the used cluster set(AssignedC) is {0, 1, 2, 3} and the unused cluster set (FreeC) is [4, . . . ,m].

Due to $P_{cid}$>0, a cluster ID ($\text{process}(301)_{cid}$) of a process (pid:301) is process (301) $P_{cid} \leftarrow P_{cid}=3$.

When a cluster ID is assigned to a process, the cluster assignment part 140 creates a set of processes having the same cluster ID, by applying Equation 8. However, a cluster ID of an initial process is set to 0, and a cluster ID is also set to 0 for daemon and service processes created by the initial process. That is, a process set Co having a cluster ID of 0 is a set of processes having a cluster ID of 0, and includes an initial process, a daemon process, and a service process.

[Equation 8]

■ $C_{cid} = \{ p_{pid} \mid \text{getCID}(p_{pid}) = cid, 0 \le pid \le (n-1), 0 \le cid \le (m-1) \}$
where cid = getCID($p_{pid}$).
■ $C_0$ ← { pid of init } ∪ { pid of daemons created by init } ∪ { pid of services created by init }.

Herein, $C_0$ is not included in the unused cluster set (FreeC).

The access information clustering part 150 includes a process access information acquisition part 151 and an access information cluster addition part 152, and clusters information accessed by any process in a cluster for each cluster ID and add the information to an information set for the cluster.

The event monitoring part 120 may detect a clustering event according to information access by any process to read a file, as shown in Equation 9.

[Equation 9]

```
■ readFile(p_pid,rfile,rdata) begin
    rdata ← read from rfile;
    addReadData(p_pid,rdata);
    addReadFile(p_pid,rfile);
  end .
```

Function ReadFile( ) in Equation 9 is a function in which a process ($p_{pid}$) reads data (rdata) from a file (rfile).

Herein, the access information acquisition part 151 acquires information read by the process ($p_{pid}$). The information may be read data (rdata), read file (rfile), etc.

The access information cluster addition part 152 clusters information acquired by the access information acquisition part 151 and creates an information set. The information set may be divided into a read data information set ($\text{ReadData}_{cid}$) and a read file information set ($\text{ReadFile}_{cid}$) according to a type (data and file) of information. In Equation 10, addReadData(Ppid, rdata) and addReadFile(Ppid, rfile) are performed to add information to the information set.

[Equation 10]

```
■ ReadData_cid = (rdata) where 0 ≤ cid ≤ (m − 1).
■ ReadFile_cid = (rfile) where 0 ≤ cid ≤ (m − 1).
■ addReadData(p_pid ,rdata) begin
    cid ← getCID(p_pid);
    ReadData_cid ← ReadData_cid ∪ (rdata);
  end.
■ addReadFile(p_pid ,rfile) begin
    cid ← getCID(p_pid);
    ReadFile_cid ← ReadFile_cid ∪ (rfile);
  end.
```

Herein, addReadData($P_{pid}$, rdata) is a function that obtains a cluster ID (cid) value of a process ($p_{pid}$) and adds read data (rdata) to the $ReadData_{cid}$ set for the cluster ID.

addReadFile(Ppid, rfile) is a function that obtains a cluster ID (cid) value of a process ($p_{pid}$) and adds a read file (rfile) to the $ReadFile_{cid}$ set for the cluster ID.

The access information state tracking part 160 includes an inspection target determination part 161, an information change tracking part 162, and an information damage tracking part 163, and obtains inspection target information, and an information change count and an information damage count of the inspection target information and outputs the same.

Specifically, the inspection target determination part 161 determines whether inspection target information is generated in an information set of a cluster having cid related to a process ($p_{pid}$), by applying Equation 11.

[Equation 11]

```
■ compareData( p_pid, cdata) begin
    cid ← getCID(p_pid);
    if( cdata ∈ ReadData_cid ) then return(TRUE);
     else return(FALSE);
  end.
■ isReadFile(p_pid, cfile) begin
    cid ← getCID(p_pid);
    if( cfile ∈ ReadFile_cid ) then return(TRUE);
     else return(FALSE);
  end.
```

Function compareData( ) returns TRUE when $ReadData_{cid}$ related to a process ($p_{pid}$) includes inspection target data (cdata), or returns FALSE otherwise.

Function isReadFile( ) returns TRUE when $ReadData_{cid}$ related to a process ($p_{pid}$) includes an inspection target file (cfile), or returns FALSE otherwise.

When the inspection target determination part 161 determines that inspection target information has been generated, the information change tracking part 162 obtains an information change count of the inspection target information on the basis of a cluster to which a process ($p_{pid}$) that has generated the inspection target information belongs, by applying Equation 12.

[Equation 12]

```
■ AlterCountSet = ( AlterCount_cid | 0 ≤ cid ≤ (m − 1), 0 ≤
  AlterCount_cid ),
■ incAlterCount(p_pid) begin
    cid ← getCID(p_pid);
    AlterCount_cid ← AlterCount_cid + 1;
    if( − (AlterCount_cid ∈ AlterCountSet) ) then
      AlterCountSet ← AlterCountSet ∪ (AlterCount_cid);
    endif
  end.
```

Herein, $AlterCount_{cid}$ refers to a change count of the cluster ID (cid), and indicates the number of times (hereinafter, referred to as an "information change count") that processes of which the cluster ID is cid have performed change (write) on a file.

AlterCountSet refers to a set of information change counts ($AlterCount_{cid}$) related to respective cluster IDs (cid).

Function incAlterCount($P_{pid}$) obtains a cluster ID (cid) value of a process ($p_{pid}$) and increases the information change count ($AlterCount_{cid}$) of the cluster ID by 1.

In addition, when the information change count of the cluster ID is not included in the set AlterCountSet, the function incAlterCount($P_{pid}$) adds the information change count of the cluster ID to the set AlterCountSet.

When the inspection target determination part 161 determines that there is inspection target information, the information damage tracking part 163 obtains an information damage count of the inspection target information by applying Equation 13.

[Equation 13]

```
■ DamageCountSet = ( DamageCount_cid | 0 ≤ cid ≤ (m − 1), 0 ≤
DamageCount_cid ).
■ incDamageCount(p_pid) begin
    cid ← getCID(p_pid);
    DamageCount_cid ← DamageCount_cid + 1;
    if( − (DamageCount_cid ∈ DamageCountSet) ) then
      DamageCountSet ← DamageCountSet ∪ (DamageCount_cid);
    endif
  end.
```

Herein, $DamageCount_{cid}$ refers to a damage count of the cluster ID (cid), and indicates the number of times (hereinafter, referred to as an "information damage count") that processes of which the cluster ID is cid have done damage (deleting, overwriting, truncating, etc.) to a file.

DamageCountSet refers to a set of information damage counts ($DamageCount_{cid}$) related to respective cluster IDs (cid).

Function incDamageCount($P_{pid}$) obtains a cluster ID (cid) value of a process ($p_{pid}$) and increase an information damage count ($DamageCount_{cid}$) of the cluster ID by 1, and when the set DamageCountSet does not include the information damage count ($DamageCount_{cid}$) of the cluster ID, the function incDamageCount adds the information damage count to the set DamageCountSet.

With respect to information output (Write) and change (Alter) as shown in Equation 14 and Equation 15, the ransomware detection part 170 compares the information change count and the information damage count obtained by the information change tracking part 162 with respective threshold values (a change threshold value ($t_{Alter}$) and a damage threshold value ($t_{Damage}$)) to determine whether a process that has accessed the inspection target information is ransomware.

[Equation 14]

```
■ writeFile(p_pid,wdata,wfile) begin
        if (isReadFile(p_pid,wfile) ≡ true) begin
    back up the file wfile to temporary storage ;
          incDamageCount(p_pid);
        end /* end if */
        cid ← getCID(p_pid);
        if( (AlterCount_cid > t_Alter) ∧ (DamageCount_cid
        > t_Damage) ) then
      /* determined as Ransomware ; */
      exit all processes corresponding to cid cluster (exitProcess( )) ;
      recover the file wfile backed up in temporary storage ;
        else
            write wdata to wfile;
            if ( compareData(wdata,p_pid) ≡ FALSE) begin
              incAlterCount(p_pid);
            end /* end if */
        end /* end if */
  end.
```

Herein, writeFile( ) refers to a function in which a process ($p_{pid}$) outputs data (wdata) to a file (wfile). When a result of calling the function isReadFile( ) is TRUE, the function writeFile( ) determines there is file damage behavior and backs up the file (wfile) to a temporary storage, and calls the function incDamageCount( ) to increase the information damage count that is a damage count ($DamageCount_{cid}$) of the cluster related to the process ($p_{pid}$). Afterward, when the information change count ($AlterCount_{cid}$) of the cluster related to the process ($p_{pid}$) exceeds the change (behavior) threshold value ($t_{Alter}$) and the information damage count ($DamageCount_{cid}$) of the cluster related to the process ($p_{pid}$) exceeds the damage (behavior) threshold value ($t_{Damage}$), it is determined that the process ($p_{pid}$) is ransomware. Accordingly, by applying Equation 16, all processes included in the cluster corresponding to the process ($p_{pid}$) are exited and the backed-up file (wfile) is recovered.

When it is determined that the process is not ransomware, the data (wdata) is output to the file (wfile) and the function compareData( ) is called. When a result is FALSE, it is determined that there is file change behavior rather than file copy behavior, and the function incAlterCount( ) is called to increase the information change count ($AlterCount_{cid}$) of the cluster related to the process ($p_{pid}$) .

[Equation 15]

```
■ alterFile (p_pid,xfile,xdata) begin
      if (isReadFile(p_pid,xfile) = true) begin
    back up the file xfile to temporary storage ;
        incDamageCount(p_pid);
      end /* end if */
      cid ← getCID(p_pid);
      if( (AlterCount_cid > t_Alter) ∧ (DamageCount_cid
       > t_Damage) ) then
     /* determined as Ransomware ; */
     exit all processes corresponding to cid cluster (exitProcess( )) ;
     recover the file xfile backed up in temporary storage ;
      else
     perform change (delete, overwrite with xdata, truncate, etc.)
     on the file xfile ;
           incAlterCount(p_pid);
      end /* end if */
  end.
```

Herein, alterFile( ) refers to a function in which a process ($p_{pid}$) performs change (delete, overwrite with xdata, truncate, etc.) on a file (xfile). When a result of calling the function isReadFile( ) is TRUE, the function alterFile( ) determines there is file damage behavior and backs up the file (xfile) to the temporary storage, and calls the function incDamageCount( ) to increase the information damage count ($DamageCount_{cid}$) of the cluster related to the process ($p_{pid}$).

Afterward, when the information change count ($AlterCount_{cid}$) of the cluster related to the process ($P_{pid}$) exceeds the change (behavior) threshold value ($t_{Alter}$) the information damage count ($DamageCount_{cid}$) of the cluster related to the process ($p_{pid}$) exceeds the damage (behavior) threshold value ($t_{Damage}$), it is determined that the process ($p_{pid}$) is ransomware. Accordingly, by applying Equation 16, all processes included in the cluster corresponding to the process are exited and the backed-up file (xfile) is recovered.

When it is determined that the process is not ransomware, change (delete, overwrite with xdata, or truncate, etc.) is performed on the file (xfile), it is determined that there is file change behavior, and the function incAlterCount( ) is called to increase the information change count ($AlterCount_{cid}$) of the cluster related to the process ($p_{pid}$).

[Equation 16]

```
■ exitProcess(p_pid) begin
    exit a process p_pid;
    P ← P − p_pid;
    C_cid ← C_cid − p_pid;
    if( C_cid = {∅} ) begin
      FreeC ← FreeC ∪ C_cid;
      AssignedC ← AssignedC − C_cid;
      ReadDatacid ← {∅};
      ReadFilecid ← {∅};
    end /* endif */
  end.
```

Function exitProcess( ) causes a process to be exited, removes the exited process ($p_{pid}$) from the process set (P), and removes the exited process ($p_{pid}$) from the $C_{cid}$ set corresponding thereto. In addition, when the $C_{cid}$ set is an empty set ({∅}), the $C_{cid}$ is added to the set FreeC, the $C_{cid}$ is removed from the set AssignedC, and the sets $ReadData_{cid}$ and $ReadFile_{cid}$ are set as empty sets ({∅}).

Figure 4:
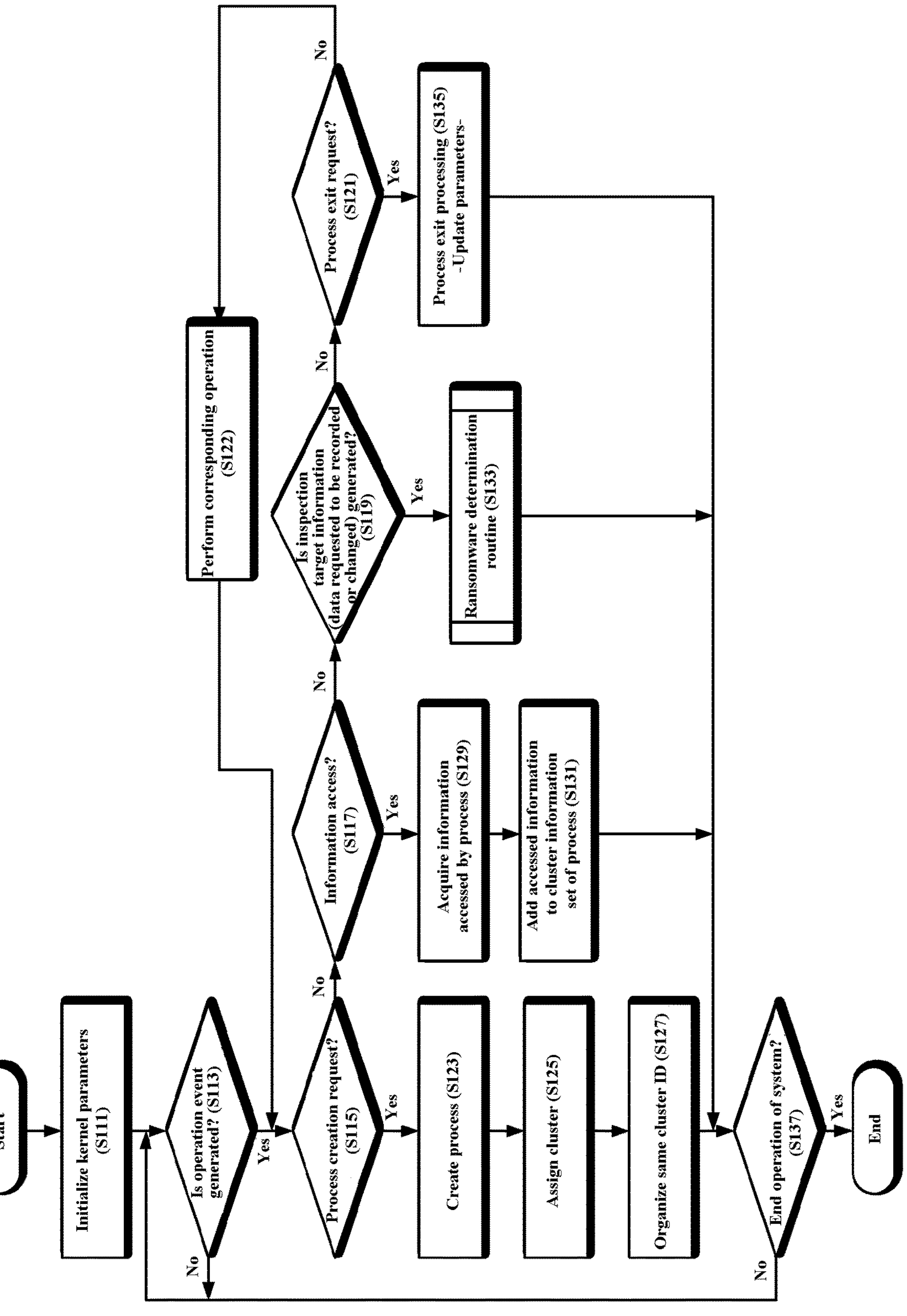
FIG. 4 is a flowchart illustrating a multiprocess clustering-based ransomware attack detection method according to the present disclosure.

FIG. 4 is a flowchart illustrating a multiprocess clustering-based ransomware attack detection method according to the present disclosure. In describing the method with reference to FIG. 4, the techniques described above with reference to FIGS. 1 to 3 will only be briefly described.

The initialization part 110 initializes kernel parameters according to the present disclosure in step S111. The kernel parameters may include a process ID (pid), a cluster ID (cid), an initial process ($P_0$), an initial cluster ($C_0$), an unused cluster set (FreeC), a used cluster set (AssignedC), a process set (P), etc.

After initialization of the parameters, the event monitoring part 120 monitors whether an operation event, that is, a clustering event, is generated in step S113.

When a clustering event is generated, the event monitoring part 120 determines which one of the following operations the clustering event is generated in response to: a process creation request in step S115, information access in step S117, generation of inspection target information through the inspection target determination part 161 in step S119, and a process exit request in step S121.

When any one of S115, S117, S119, and S121 is not detected, the event monitoring part 120 enables an operation corresponding to the generated operation event to be performed in step S122.

When the clustering event is generated in response to a process creation request, the event monitoring part 120 activates the process creation part 130.

The activated process creation part 130 creates a process ($p_{pid}$) and then activates the cluster assignment part 140.

The activated cluster assignment part 140 acquires a cluster ID of a parent process of the process ($p_{pid}$). When the cluster ID of the parent process is 0, the cluster assignment part 140 assigns a new cluster ID to the created process, or when the cluster ID of the parent process is not 0, the cluster assignment part 140 assigns the cluster ID of the parent process to the created process in step S125.

When the cluster ID (cid) is assigned to the process ($p_{pid}$), the cluster assignment part 140 creates a cluster set ($C_{cid}$ ) for the cluster ID, cid, to cluster processes ($p_{pid}$) for the cluster ID in step S127.

However, when the clustering event is generated in response to information access, the event monitoring part 120 activates the access information clustering part 150.

The activated access information clustering part 150 acquires information accessed by a process that has accessed the information in step S129, and then clusters the information into an information set corresponding to a cluster ID in step S131.

When the clustering event is generated in response to generation of inspection target information, the event monitoring part 120 determines whether the process ($p_{pid}$) is ransomware through the access information state tracking part 160 and the ransomware detection part 170, and when it is determined that the process is ransomware, the event monitoring part 120 generates a process exit event for all processes belonging to a cluster set for a cluster ID to which the process belongs in step S133.

The ransomware determination method will be described in detail below with reference to FIG. 5.

When the clustering event is generated in response to a process exit event, the event monitoring part 120 performs a process exit processing operation.

Figure 5:
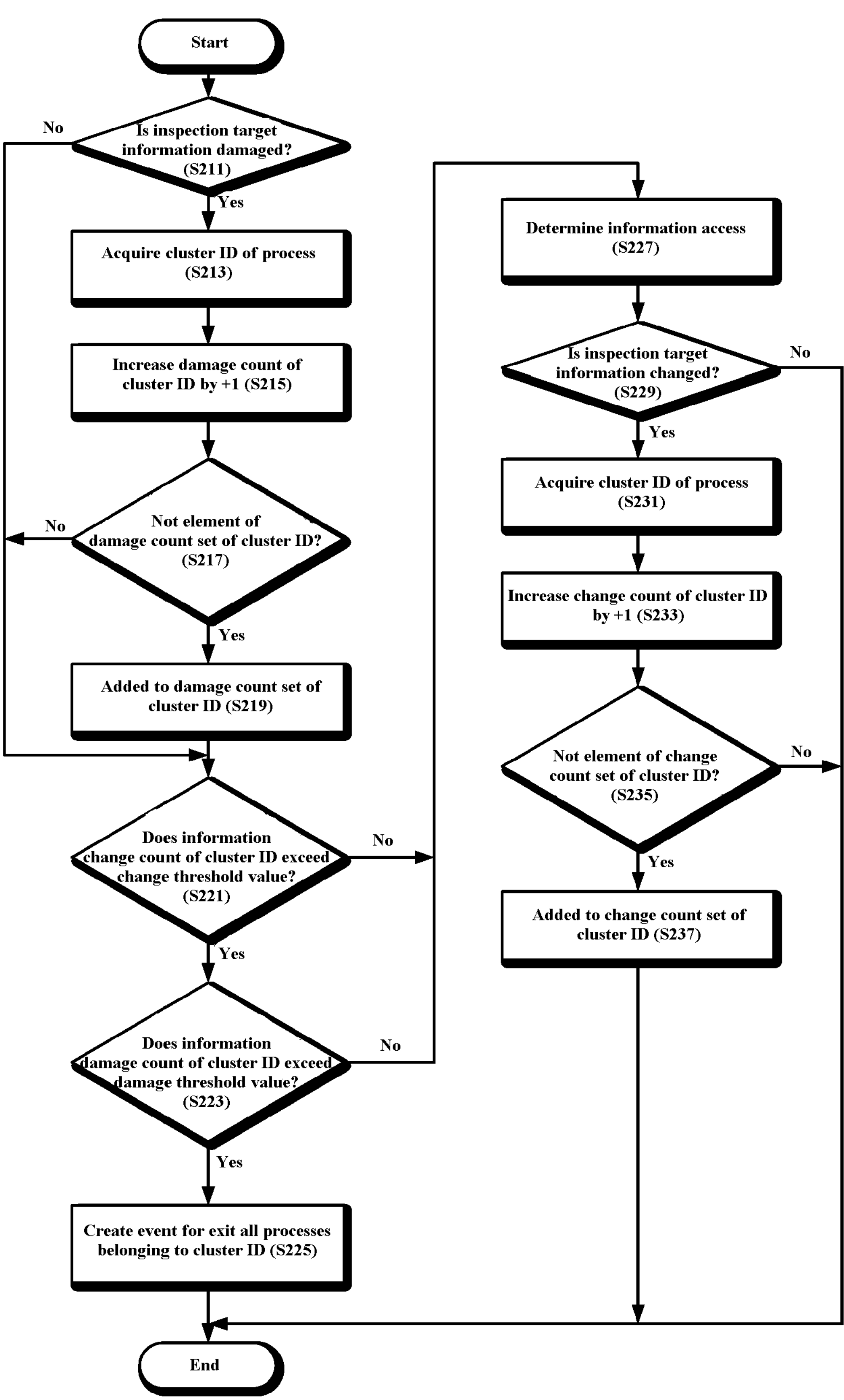
FIG. 5 is a flowchart illustrating a ransomware determination method of a multiprocess clustering-based ransomware attack detection method according to the present disclosure.

FIG. 5 is a flowchart illustrating a ransomware determination method of a multiprocess clustering-based ransomware attack detection method according to the present disclosure.

Referring to FIG. 5, the inspection target determination part 161 determines whether inspection target information is damaged or changed in step S211.

When it is determined that the inspection target information is damaged, the inspection target determination part 161 activates the information damage tracking part 163.

The activated information damage tracking part 163 acquires a cluster ID of the process ($p_{pid}$) in step S213.

When the cluster ID is acquired, the information damage tracking part 163 increases a damage count, that is, an information damage count, of the cluster ID by 1 in step S215.

After the information damage count is increased, the information damage tracking part 163 determines whether the information damage count of the cluster ID is an element of a damage count set in step S217.

When it is not an element as a result of determination, the information damage tracking part 163 adds the information damage count of the cluster ID to the damage count set in step S219.

When it is added to the information damage count set, the ransomware detection part 170 is activated. The activated ransomware detection part 170 determines whether an information change count of the cluster ID exceeds a change threshold value in step S221, and determines whether the information damage count of the cluster ID exceeds a damage threshold value in step S223.

As a result of determination, when the information change count exceeds the change threshold value and the information damage count exceeds the damage threshold value, the ransomware detection part 170 determines that the process ($p_{pid}$) is ransomware, and a process exit event for all processes belonging to the cluster ID assigned to the process is generated in step S225.

Conversely, when the information change count does not exceed the change threshold value or the information damage count does not exceed the damage threshold value, the ransomware detection part 170 allows information access in step S227.

When it is determined that the inspection target information is changed, the inspection target determination part 161 activates the information change tracking part 162.

The activated information change tracking part 162 acquires a cluster ID of the process in step S231.

When the cluster ID is acquired, the information change tracking part 162 increases a change count, that is, the information change count, of the cluster ID by 1 in step S233.

After the information change count is increased, the information change tracking part 162 determines whether the information change count of the cluster ID is included in a change count set in step S235.

As a result of determination, when the information change count of the cluster ID is not an element of the change count set, the information change tracking part 162 adds the information change count in step S237.

In the meantime, the present disclosure is not limited to the above-described exemplary embodiments, and it will be understood by those skilled in the art that various improvements, modifications, substitutions, and additions may be made without departing from the scope of the present disclosure. It is noted that if embodiments by such improvements, modifications, substitutions, and additions are within the scope of the following appended claims, the technical ideas thereof are also within the scope of the present disclosure.

DESCRIPTION OF THE REFERENCE NUMERALS IN THE DRAWINGS

10: hardware layer part 20: operating system layer part
21: kernel layer part 22: system operation layer part
30: application layer part 100: ransomware attack detection device
110: initialization part 120: event monitoring part
130: process creation part 140: cluster assignment part
150: access information clustering part 151: process access information acquisition part
152: access information cluster addition part 160: access information state tracking part
161: inspection target determination part 162: information change tracking part
163: information damage tracking part 170: ransomware detection part

The invention claimed is:

1. A multiprocess clustering-based ransomware attack detection device, comprising:

an event monitoring part configured to monitor whether a clustering event is generated in response to a process creation request and information access;

a process creation part configured to create a process when the clustering event is generated in response to the process creation request;

a cluster assignment part configured to determine whether the created process is a parent process, and to assign an unused cluster identification (ID) when the created process is the parent process or assign a cluster ID assigned to the parent process of the created process when the created process is not the parent process, and to cluster processes related to a cluster having the cluster ID;

an access information clustering part configured to cluster information accessed by any process of the cluster, and to add the information to an information set for the cluster;

an access information state tracking part configured to determine whether any process among the processes clustered for the cluster accesses the information within the cluster, to detect access to the information by the any process as generation of inspection target information, and to obtain an information change count and an information damage count of the cluster related to the detected inspection target information; and a ransomware detection part configured to determine the process as ransomware when the information change count and the information damage count exceed respective threshold values and to exit the processes of the cluster into which the process is clustered, wherein the cluster assignment part is configured to obtain and assign the cluster ID following a latest assigned cluster ID in an unused cluster set when the cluster ID of the parent process of the created process is 0, or obtain the cluster ID of the parent process when the cluster ID of the parent process is not 0, and calculate a unique cluster ID value to be used, by performing modular arithmetic on a sum of a latest cluster ID value and an incremental value (Δ) when the cluster ID of the parent process is 0, assign the cluster ID to the created process, and add the created process to a cluster having the cluster ID to cluster the created process and the processes related thereto into one cluster, wherein the event monitoring part is configured to monitor access by any process in the cluster having the cluster ID, to particular information, and wherein the access information clustering part comprises:

a process access information acquisition part configured to acquire the particular information accessed by any process in the cluster having the cluster ID; and an access information cluster addition part configured to add the acquired particular information to a cluster information set for the cluster ID.

2. The device of claim 1, further comprising an initialization part configured to initialize, when a system starts, cluster IDs of an initial process and a daemon process and a service process created by the initial process to 0, to initialize an unused cluster set (FreeC) so that the unused cluster set includes all cluster IDs except only a cluster ID of 0, and to initialize a used cluster set (AssignedC) so that the used cluster set includes only the cluster ID of 0.

3. The device of claim 1, wherein the access information state tracking part comprises:

an inspection target determination part configured to determine whether any process among the processes clustered for the cluster accesses information within the cluster, and to detect access to the particular information by another process as generation of inspection target information;

an information change tracking part configured to obtain, when generation of the inspection target information is detected, the information change count of the inspection target information for the processes of the cluster into which the process that has generated the inspection target information is clustered; and an information damage tracking part configured to obtain the information damage count of the inspection target information for the processes of the cluster.

4. The device of claim 3, wherein the information is data and a file.

5. A multiprocess clustering-based ransomware attack detection method, comprising:

monitoring, by an event monitoring part in an event monitoring stage, whether a clustering event is generated in response to a process creation request or information access;

creating, by a process creation part in a process creation stage, a process when the clustering event is generated in response to the process creation request;

assigning, by a cluster assignment part in a cluster assignment stage, an unused cluster ID when a cluster ID of a parent process of the created process is 0 or assigning the cluster ID of the parent process to the created process when the cluster ID of the parent process is not 0, and clustering processes related to a cluster having the cluster ID;

clustering, by an access information clustering part in an access information clustering stage, information accessed by any process of the cluster, and adding the information to an information set for the cluster;

determining, by an access information state tracking part in an access information state tracking stage, whether any process among the processes clustered for the cluster accesses information within the cluster, and detecting access to the information by another process as generation of inspection target information, and obtaining an information change count and an information damage count of the cluster related to the detected inspection target information; and determining, by a ransomware detection part in a ransomware detection stage, the process as ransomware when the information change count and the information damage count exceed respective threshold values, and exiting the processes of the cluster into which the process is clustered, wherein the cluster assignment stage comprises:

determining, in a parent process existence determination step, whether the parent process of the created process exists;

obtaining and assigning, in a new cluster assignment step, the cluster ID following a latest assigned cluster ID in the unused cluster set when the parent process does not exist;

obtaining, in a parent process cluster assignment step, the cluster ID of the parent process when the parent process of the created process exists, when a parent cluster ID is 0, the cluster assignment part calculates a cluster ID value to be used, by performing modular arithmetic on a sum of a latest cluster ID value and an incremental value (Δ), and assigning the cluster ID of the parent process to the created process; and adding, in a process clustering step after assignment of the cluster, the created process to a cluster having the cluster ID, and clustering the created process and the processes related thereto, and wherein the access information clustering stage comprises:

monitoring, by the event monitoring part, access by any process in the cluster having the cluster ID, to particular information;

acquiring, by a process access information acquisition part in a process access information acquisition step, the particular information accessed by any process of the cluster having the cluster ID; and adding, by a cluster addition part in an access information cluster addition step, the acquired particular information to a cluster information set for the cluster ID.

6. The method of claim 5, further comprising initializing, by an initialization part in an initialization stage when a system starts, cluster IDs of an initial process and a daemon process and a service process created by the initial process to 0, and initializing an unused cluster set (FreeC) so that the unused cluster set includes all cluster IDs except only a cluster ID of 0, and initializing a used cluster set (AssignedC) so that the used cluster set includes only the cluster ID of 0.

7. The method of claim 5, wherein the access information state tracking stage comprises:

determining, by an inspection target determination part in an inspection target determination step, whether any process among the processes clustered for the cluster accesses information within the cluster, and detecting access to the information by the any process as generation of inspection target information;

obtaining, by an information change tracking part in an information change tracking step, the information change count of the information for the processes of the cluster into which the process that has generated the inspection target information is clustered; and obtaining, by an information damage tracking part in an information damage tracking step, the information damage count of the information for the processes of the cluster.

8. A non-transitory computer readable storage medium having a program recorded thereon, the program being configured to implement a multiprocess clustering-based ransomware attack detection method and the method comprising:

monitoring, by an event monitoring part in an event monitoring stage, whether a clustering event is generated in response to a process creation request or information access;

creating, by a process creation part in a process creation stage, a process when the clustering event is generated in response to the process creation request;

assigning, by a cluster assignment part in a cluster assignment stage, the created process a cluster identification (ID) assigned to a parent process of the created process to, processes related to a cluster having the cluster ID;

clustering, by an access information clustering part in an access information clustering stage, information accessed by any process of the cluster, and adding the information to an information set for the cluster;

determining, by an access information state tracking part in an access information state tracking stage, whether any process among the processes clustered for the cluster accesses information within the cluster, and detecting access to the information by the any process as generation of inspection target information, and obtaining an information change count and an information damage count of the cluster related to the detected inspection target information; and determining, by a ransomware detection part in a ransomware detection stage, the process as ransomware when the information change count and the information damage count exceed respective threshold values, and exiting the processes of the cluster into which the process is clustered, wherein the cluster assignment stage comprises:

obtaining, in a parent process cluster ID acquisition step, the cluster ID of the parent process of the created process;

obtaining and assigning, in a new cluster assignment step, the cluster ID following a latest assigned cluster ID in an unused cluster set when the cluster ID of the parent process is 0;

when a parent cluster ID is 0, the cluster assignment part calculates a cluster ID value to be used, by performing modular arithmetic on a sum of a latest cluster ID value and an incremental value ($\Delta$);

assigning, in a parent process cluster assignment step, the cluster ID of the parent process to the created process when the cluster ID of the parent process of the created process is not 0; and adding, in a process clustering step after assignment of the cluster, the created process to a cluster having the cluster ID, and clustering the created process and the processes related thereto, and wherein the access information clustering stage comprises:

monitoring, by the event monitoring part, access by any process in the cluster having the cluster ID, to particular information;

acquiring, by a process access information acquisition part in a process access information acquisition step, the particular information accessed by any process of the cluster having the cluster ID; and adding, by a cluster addition part in an access information cluster addition step, the acquired particular information to a cluster information set for the cluster ID.

9. The non-transitory computer readable storage medium of claim 8, wherein the method further comprises initializing, by an initialization part in an initialization stage when a system starts, cluster IDs of an initial process and a daemon process and a service process created by the initial process to 0, and initializing the unused cluster set (FreeC) so that the unused cluster set includes all cluster IDs except only a cluster ID of 0, and initializing a used cluster set (AssignedC) so that the used cluster set includes only the cluster ID of 0.

10. The non-transitory computer readable storage medium of claim 8, wherein the access information state tracking stage comprises:

determining, by an inspection target determination part in an inspection target determination step, whether any process among the processes clustered for the cluster accesses information accessed by another process within the cluster, and detecting access to the information by the any process as generation of inspection target information;

obtaining, by an information change tracking part in an information change tracking step, the information change count of the information for the processes of the cluster into which the process that has generated the inspection target information is clustered; and obtaining, by an information damage tracking part in an information damage detection step, the information damage count of the information for the processes of the cluster.

* * * * *